(12) United States Patent
Shijie et al.

(10) Patent No.: US 10,829,856 B2
(45) Date of Patent: Nov. 10, 2020

(54) ELECTRO-SPARK DEPOSITION SURFACE MODIFICATION PROCESS AND APPARATUS

(71) Applicant: HUYS INDUSTRIES LIMITED, Weston (CA)

(72) Inventors: Dong Shijie, Wuhan (CN); Luo Ping, Wuhan (CN); Chang Ying, Wuhan (CN); Wang Huihu, Wuhan (CN); Xie Zhixiong, Wuhan (CN); Zheng Zhong, Wuhan (CN); Yang Wei, Wuhan (CN); Yang Lianzhuo, Wuhan (CN); Liu Qi, Wuhan (CN); Wang Yanqing, Wuhan (CN)

(73) Assignee: Huys Industries Limited (CA)

( * ) Notice: Subject to any disclaimer, the term of this patent is extended or adjusted under 35 U.S.C. 154(b) by 1075 days.

(21) Appl. No.: 14/541,985

(22) Filed: Nov. 14, 2014

(65) Prior Publication Data

US 2015/0165538 A1 Jun. 18, 2015

(30) Foreign Application Priority Data

Dec. 16, 2013 (CN) .......................... 2013 1 0681859

(51) Int. Cl.
*B23K 9/04* (2006.01)
*B23K 9/30* (2006.01)
(Continued)

(52) U.S. Cl.
CPC ............ *C23C 26/00* (2013.01); *B23K 35/402* (2013.01)

(58) Field of Classification Search
CPC .......... B23K 35/402; B23K 9/04; B23K 9/30; B23K 9/022; B23K 37/00; B23K 20/12;
(Continued)

(56) References Cited

U.S. PATENT DOCUMENTS 3,764,771 A * 10/1973 Roy .......................... B23D 1/12
219/69.2
4,029,931 A 6/1977 Simmons
(Continued)

FOREIGN PATENT DOCUMENTS

CA 0902189 A1 6/1972
CA 1065023 10/1979
(Continued)

OTHER PUBLICATIONS

TotalPatent: Abstract of DE10217781 A1; Title: Process for the local electro-spark coating of metals and alloys for surface treatment comprises forming first impulse category up to contact of the electrode tool and detail and second Impulse category during contact of the above.

(Continued)

*Primary Examiner* — Justin C Dodson
(74) *Attorney, Agent, or Firm* — Ridout and Maybee LLP

(57) ABSTRACT

A surface modification process and apparatus for the electro-spark deposition (ESD) on a workpiece may include mounting a workpiece on a rotationally driven mounting. The contact surface of the workpiece is ESD coated. Ultrasonic vibration is applied to the deposition layer during its crystallization phase. The workpiece may be a resistance spot welding electrode. The apparatus may have a vibrating applicator, ESD power supply, integrated ultrasonic transducer assembly, a work station having a rotational drive and an ultrasonic generator. The ultrasonic generator is connected to the ultrasonic transducer. The ultrasonic transducer assembly and the rotating driving work bench unit are integrated in a single assembly. The workpiece seats on the ultrasonic transducer assembly. The deposition of a surface coating occurs during simultaneous application of electro-spark deposition and ultrasonic vibration.

14 Claims, 4 Drawing Sheets

(51) Int. Cl.
*C23C 26/00* (2006.01)
*B23K 35/40* (2006.01)

(58) Field of Classification Search
CPC ............ B23K 20/1205; B23K 20/1215; B23K 20/1122; B23K 20/123; B23K 20/125; B23K 20/10; C23C 4/131; C23C 4/18; C23C 4/10; C23C 26/00
USPC ........... 219/76.1, 76.13, 76.11, 76.12, 76.14, 219/76.15; 427/580
See application file for complete search history.

(56) References Cited

U.S. PATENT DOCUMENTS

| | | | | |
|---|---|---|---|---|
| 4,098,447 | A | * | 7/1978 | Edson ................. B23K 20/007 219/68 |
| 4,861,961 | A | | 8/1989 | Huys |
| 4,866,237 | A | | 9/1989 | Inoue |
| 4,992,639 | A | * | 2/1991 | Watkins ................. B23H 5/04 219/69.17 |
| 5,281,789 | A | | 1/1994 | Mertz et al. |
| 5,448,035 | A | | 9/1995 | Thutt et al. |
| 5,688,364 | A | | 11/1997 | Sato |
| 5,914,057 | A | | 6/1999 | Nippert et al. |
| 6,020,568 | A | * | 2/2000 | Joseph ................. B23K 9/044 219/76.13 |
| 6,452,130 | B1 | | 9/2002 | Qian et al. |
| 7,538,294 | B2 | | 5/2009 | Scotchmer |
| 8,101,040 | B2 | | 1/2012 | Shibata et al. |
| 2005/0092728 | A1 | | 5/2005 | Barbeau et al. |
| 2006/0029512 | A1 | | 2/2006 | Dong et al. |
| 2009/0314748 | A1 | * | 12/2009 | Rao .......................... B23H 7/38 219/69.17 |
| 2011/0042356 | A1 | | 2/2011 | Leung et al. |

FOREIGN PATENT DOCUMENTS

| | | |
|---|---|---|
| CA | 1177545 | 11/1984 |
| CA | 2061635 | 3/1997 |
| CA | 2712119 A1 | 2/2011 |
| CN | 101994079 | 3/2011 |
| CN | 102019531 | 4/2011 |
| CN | 103131981 | 8/2015 |
| CN | 103805929 A | 6/2016 |
| CN | 103993312 B | 9/2016 |
| DE | 19828798 | 12/1999 |
| DE | 10217781 A1 | 10/2003 |
| EP | 0192880 B1 | 9/1986 |
| JP | 1136960 | 5/1989 |
| WO | 1995/11107 | 4/1995 |
| WO | 2006/122410 | 11/2006 |

OTHER PUBLICATIONS

TotalPatent: Abstract of JP11136960, Title: Three Phase Inverter Circuit Module.
TotalPatent: Abstract of DE19828798 A1; Title: Welding electrode with an end cap incorporating a cooling channel bounded by an end surface.
Park et al., "Numerical Simulation of Plunge Force during the Plunge Phase of Friction Stir Welding and Ultrasonic Assisted FSW", IMECE2008-67002, 2008 ASME International Mechanical Engineering Congress and Exposition, Oct. 31, 2008-Nov. 6, 2008, Boston, Massachusetts, U.S.A. pp. 1-6.
Chen et al., Surface modification of resistance welding electrodes by electro-spark deposited composite coatings Part II, Metallurgical behavior during welding, www.elsevier.com, Science Direct, Surface & Coatings Technology 201 (2006), pp. 2419-2430.
Chen et al., Surface modification of resistance welding electrode by electro-spark deposited composite coatings: Part I, Coating characterization, www.elsevier.com, ScienceDirect, Surface & Coatings Technology 201 (2006), pp. 1503-1510.
Zou et al., "Surface modified long-life electrode for resistance spot welding of Zn-coated steel", www.elsevier.com, ScienceDirect, Journal of Materials Processing Technology 209 (2009), pp. 4141-4146.
Kumar, "Ultrasonic assisted friction stir processing of 6063 aluminum alloy", www.elsevier.com, ScienceDirect, Archives of Civil and Mechanical Engineering 16 (2016), pp. 473-484.
Avelland-Fenoel et al., "A review about Friction Stir Welding of metal matrix composites", www.elsevier.com, ScienceDirect, Materials Characterization 120 (2016), pp. 1-17.
Lu, "Improvement of copper plating adhesion on silane modified PET film by ultrasonic-assisted electroless deposition", www.elsevier.com, ScienceDirect, Applied Surface Science 256 (2010), pp. 3554-3558.
Liu, "Elimination of tunnel defect in ultrasonic vibration enhanced friction stir welding", www.elsevier.com, ScienceDirect, Materials and Design 90 (2016), pp. 350-358.
Wang et al., "Si particulate-reinforced Zn-Al based composites joints of hypereutectic Al-50Si alloys by ultrasonic-assisted soldering", www.elsevier.com, ScienceDirect, Materials and Design 107 (2016), pp. 41-46.
Niksefat et al., "Mechanical and electromechanical properties of ultrasonic-assisted electrodes deposition of Ni—B—TiO2 composite coatings", www.elsevier.com, ScienceDirect, Journal of Alloys and Compounds 633 (2015), pp. 127-136.
Zhao et al., "Microstructure evolution and mechanical properties of ultrasonic-assisted soldering joints of 2024 aluminum alloys", www.elsevier.com, ScienceDirect, Trans Nonferrous Met. Soc. China 21 (2011), pp. 1937-1943.
Rostamiyan et al., "Experimental studies on ultrasonically assisted friction stir spot welding of AA6061", www.elsevier.com, ScienceDirect, Archives of Civil and Mechanical Engineering 15 (2015), pp. 335-346.
Chen et al., Surface Modification of Resistance Welding Electrodes by Electra-Spark Deposited Coatings, Department of Mechanical Engineering; University of Waterloo; Waterloo, ON, Canada; Coatings 2005; Materials Science & Technology 2005, pp. 59-62.
TotalPatent, English machine translation of Abstract, Chinese Patent Publication No. CN102019531.
TotalPatent, English machine translation of Abstract, Chinese Patent Publication No. CN103993312.
TotalPatent, English machine translation of Abstract, Chinese Patent Publication No. CN101994079.
TotalPatent, English machine translation of Abstract, Chinese Patent Publication No. CN103805929.
TotalPatent, English machine translation of Abstract, Chinese Patent Publication No. CN103131981.
Global Dossier website: First Office Action, received in connection to CN Pat. Appn. No. 201310681469.1, dated Jul. 22, 2015.
Global Dossier website: Second Office Action, received in connection to CN Pat. Appn. No. 201310681469.1, dated Dec. 22, 2015.
English machine translation of the First Office Action, received in connection to CN Pat. Appn. No. 201310681469.1, dated Jul. 22, 2015.
English machine translation of the Second Office Action, received in connection to CN Pat. Appn. No. 201310681469.1, dated Dec. 22, 2015.

* cited by examiner

ELECTRO-SPARK DEPOSITION SURFACE MODIFICATION PROCESS AND APPARATUS

This application is based upon, and claims the benefit under the Paris Convention of the priority of, Chinese Patent Application 2013 1068 1599.1 filed Dec. 17, 2013, the specification and drawings thereof being incorporated herein by reference.

FIELD OF INVENTION

The present invention pertains to a surface modification process and apparatus for electro-spark deposition on a workpiece.

BACKGROUND

The use of galvanized steel and aluminum sheets is becoming more popular in the production of automobiles. Resistance welding technology has become one of the most important manufacturing processes in automobile manufacturing. Resistance welding has the advantages of high production yields and of low costs. It is also quite easily integrated into the automation process in many industries including automobiles. Welding electrodes may be common consumable parts in the resistance welding process.

Resistance welding electrodes serve several purposes or functions: the conduction of welding current; application of closing pressure on the mating parts to be welded, and heat dissipation. The temperature of the welding electrode in contact with the workpiece is quite high, and the welding electrode itself generates heat when welding current flows due to its own internal resistance. The temperature on the top surface of the welding electrode may rise very quickly to a level that is only marginally lower than the weld nugget temperature.

A welding electrode may deteriorate and lose its usefulness very quickly under the influence of high weld pressure and high temperature. This problem is more severe in the welding of aluminum alloy materials. Studies around the world have looked into alternatives for improving, or extending the working life of welding electrodes. It has been found that there are two practical ways to improve welding electrode life. The first is directed toward development of better or stronger welding electrode materials. The second is to treat or process the contact surface of the welding electrode. Since the welding electrode contact face is subject to pressure, heat and metallurgical effects during the welding process, it may be effective, and possibly economical, to treat the surface of the welding electrode.

There are various methods of treating welding electrode surfaces. They include:

1. Cobalt Brushing Plating

A layer of cobalt material is deposited on the welding face of a copper welding electrode using a brush plating process. Cobalt-deposited, or coated, welding electrodes has been shown to be capable of improving resistance spot welding of galvanized steel sheets. A thicker ESD coating layer may tend to yield better improvement to the resistance spot welding of galvanized steel sheets. The deposited cobalt layer tends to exhibit strong adhesion to the substrate material. The coating provides a barrier tending to discourage or to prevent the alloying process of copper-zinc such as might otherwise occur between the copper material of the welding electrode and the zinc coating of the galvanized steel sheets, e.g., as may occur when zinc tends to migrate into the copper matrix during resistance spot welding. A drawback of cobalt brush plating is that there are strict regulations on this kind of equipment or apparatus as it may be dangerous to the environment. This technology is rarely applied in large scale manufacturing.

2. Surface Titanizing

Titanium material is permitted to diffuse into the surface of the copper electrodes using thee regular chemical thermal treatments. Experimental results reveal that the hardness of the surface of the copper electrodes may tend to be increased after the application of titanium to the surface of the copper electrodes using this chemical method. It may tend to improve the deformation resistance of the copper electrodes. The interaction of the penetrated titanium and the copper material improves the anti-wear ability and raises the thermal stability of the welding electrode. This may tend to discourage or reduce the interaction between the copper and the zinc. All of these effects may tend to improve the working life of the resistance spot welding copper electrode. However, the improvement in working life using surface titanizing may not be significantly longer. It may be about twice the regular life.

3. Tungsten Ion Implantation

This technology works in vacuum conditions where tungsten atoms are ionized into a plasma stream. The ionized tungsten ions are accelerated under an electric field and driven into the surface of the copper electrode inside a chamber. A layer of tungsten ions will change the composition and structure of the surface material of the copper electrode, giving it different surface characteristics. Experimental results reveal that the antioxidant capacity of the copper electrode may be increased significantly after tungsten ion implantation. Damage to the electrode during the resistance welding process may tend to decrease. The physical properties of the copper electrode, such as fatigue resistance, may also improve. The rate of increase of the weld face area is lower too. The life of copper electrode may increase from 600 welds to 800 welds after the tungsten ion implantation process. This process permits a limited increase in electrode life. Additionally, the technology involved in the tungsten ion implantation is quite complicated and may require substantial capital equipment investment.

4. Electro-Spark Deposition (ESD)

ESD is a low-stress surfacing-hardening process that causes little distortion to the workpiece. ESD involves atomic-level metallurgical bonding of a discharge electrode coating material to the base metal by electro-spark discharge. ESD is a surface treatment process that improves the physical and mechanic properties of the surface of the base metal. As a form of micro-arc welding technology, ESD introduces a large current pulse during a capacitance discharge. A high temperature (5000-25000 K) plasma arcing column melts or vaporizes a small part of the electrode rod coating material. The molten or vaporized electrode material is transferred to the surface of the base metal by this pulsed arcing micro welding. These traits permit ESD to be used in many surface treatment applications, including the surface coating of resistance spot welding electrodes. Successful ESD examples of resistance spot welding electrode coatings includes the surface in-situ deposition of TiC, TiB2, and TiB2-TiC. Welding electrodes with TiC, TiB2 or TiC—TiB2 coatings have been used in the spot welding of automobiles. ESD treated welding electrodes have made significant advances in industrial applications. However, there are some defects found in ESD coatings. For example, the grain in the heat affected zone (HAZ) near the coating layer may become coarse due to high thermal stresses arising during the ESD process (as shown in the Figures). Consequently, welding electrodes may not achieve the full potential life extension because of the flaws in the heat affect zone of the substrate matrix.

In the view of the inventors herein, ultrasonic vibration may help to improve the welding structure and performance in the welding and casting industries. It is the ultrasonic cavitation and acoustic streaming effects of ultrasonic vibration that may aid in refining grains in the heat affects zones of castings and weld pools. Chinese patent CN102019531A, which pertains to a portable ultrasonic assisted electro-spark deposition integrated repair and polish device and technology, suggests an ultrasonic approach. However, the ultrasonic excitation is added to modulation of the discharge electrode. This ultrasonic vibration applies only to the coating transfer of the deposition material. It appears to have little effect on the coating layer on the base metal of the workpiece.

SUMMARY OF INVENTION

The following summary is provided to introduce the reader to the more detailed discussion to follow. The summary is not intended to limit or define the claims or the scope of the claims.

In an aspect of the present invention there is a surface coating process for use in applying an ESD coating to a workpiece. The process includes applying a surface coating to a workpiece using electro-spark deposition; and applying ultrasonic vibration to the workpiece.

In a feature of that aspect of the invention, the ultrasonic vibration is applied to the workpiece during the electro-spark deposition of the coating. In another feature, the ultrasonic vibration is applied to the workpiece during crystallization of the coating. In still another feature, the ultrasonic vibration is applied to the workpiece during the electro-spark deposition of the coating and during crystallization of the coating. In a further feature, the ESD coating is deposited on the workpiece by an applicator. The applicator is a vibrating applicator. The applicator vibrates during deposition of the coating independently of the ultrasonic vibration. In still another feature, the workpiece is held in a rotating tool holder, and the workpiece is driven to rotate during the process. In a further additional feature, at least one of (a) the ultrasonic vibration is applied to the workpiece during the electro-spark deposition of the coating; and (b) the ultrasonic vibration is applied to the workpiece during crystallization of the coating. In a still further feature, the ESD coating is deposited on the workpiece by an applicator. The applicator is a vibrating applicator, and the applicator vibrates during deposition of the coating in addition to the ultrasonic vibration.

In another feature, the ESD coating is deposited on the workpiece by an applicator. The applicator is a vibrating applicator, and the applicator vibrates during deposition of the coating in addition to the ultrasonic vibration. In an additional feature, the process includes applying the ESD coating to a resistance spot welding electrode as the workpiece. In still another feature, the process includes depositing a coating that includes at least one of (a) TiC and (b) $TiB_2$, on the workpiece. In yet another feature, the process includes applying the coating to a metal matrix that includes copper. In a still further feature, the process includes applying the ESD coating to a resistance spot welding electrode as the workpiece, that spot welding electrode having a metal matrix that includes copper; and depositing a coating that includes at least one of (a) TiC and (b) $TiB_2$, on the workpiece.

In another aspect of the invention there is an apparatus for electro-spark deposition of a surface coating on a workpiece. The apparatus has a tool holder to which the workpiece is mounted; a coating applicator; and an ultrasonic vibration source mounted to act on the tool holder, and thereby directly to apply ultrasonic vibration to the workpiece.

In a feature of that aspect of the invention, the ultrasonic vibration source is operably connected to apply ultrasonic vibration to the tool holder at least one of: (a) during the electro-spark deposition of the coating; and (b) during crystallization of the coating. In another feature, the coating applicator is a vibrating coating applicator. In a further feature, the tool holder is a rotating tool holder. In still another feature, the tool holder is a rotating tool holder; and the ultrasonic vibration source is operably connected to apply ultrasonic vibration to the tool holder at least one of: (a) during the electro-spark deposition of the coating; and (b) during crystallization of the coating. In a further additional feature, the coating applicator is a vibrating coating applicator. In a still further feature, the workpiece is a resistance spot welding electrode. In another feature, the apparatus has a vibrating applicator, an ESD power supply, an ultrasonic transducer assembly, a work station having a rotating drive and an ultrasonic generator; the ultrasonic generator being connected to drive the ultrasonic transducer; the ultrasonic transducer assembly and the rotating drive work station being assembled as a single integrated unit; and the workpiece being mountable in a tool holder seat vibrated by the ultrasonic transducer.

In still another feature, the apparatus includes: an ESD power supply having a positive power terminal and a negative power terminal; a vibrating applicator having a resilient conductor spring, a discharge electrode mounting, a discharge electrode, a driven eccentric, a handle, an insulated support, a flexible drive shaft, and a low-power applicator motor; an integrated transducer assembly on which to mount a workpiece to be coated; a work-station negative terminal, an integrated transducer negative terminal, an integrated transducer positive terminal, an integrated transducer body, a transducer horn, an ultrasonic transducer, a flat pulley, bearing, and tool holder; a work-station drive assembly having a work bench drive motor, a drive belt; an ultrasonic generator having an ultrasonic power output negative terminal, and an ultrasonic power output positive terminal. The ESD power positive terminal is connected to the conductor spring. The ESD power negative terminal is connected to the work-station negative terminal. The discharge electrode is mounted to the conductor spring. The applicator is connected to the low-power motor through the flexible shaft. The eccentric wheel is driven in rotation by the driving of the low-power motor through the flexible shaft to drive vibrating deposition. The ultrasonic power output negative terminal is connected to the integrated transducer negative terminal. The ultrasonic power output positive terminal is connected to the integrated transducer negative terminal. The integrated ultrasonic transducer assembly is driven in rotation by the drive motor through the flat pulley and drive belt. The ultrasonic transducer is connected to the integrated transducer negative terminal and the integrated transducer positive terminal, respectively. The transducer horn and ultrasonic transducer are combined to form a shaft of the rotary work station; the tool holder being mounted to the rotary work station; whereby the workpiece is mounted to the work-station for rotating ultrasonic-assisted electro-spark deposition.

There are many combinations and permutations of aspects and features. It will be understood that any of the features may be combined, as appropriate, with any of the aspects enumerated herein.

BRIEF DESCRIPTION OF THE ILLUSTRATIONS

The foregoing aspects and features of the invention may be explained and understood with the aid of the accompanying illustrations, in which.

Figure 1:
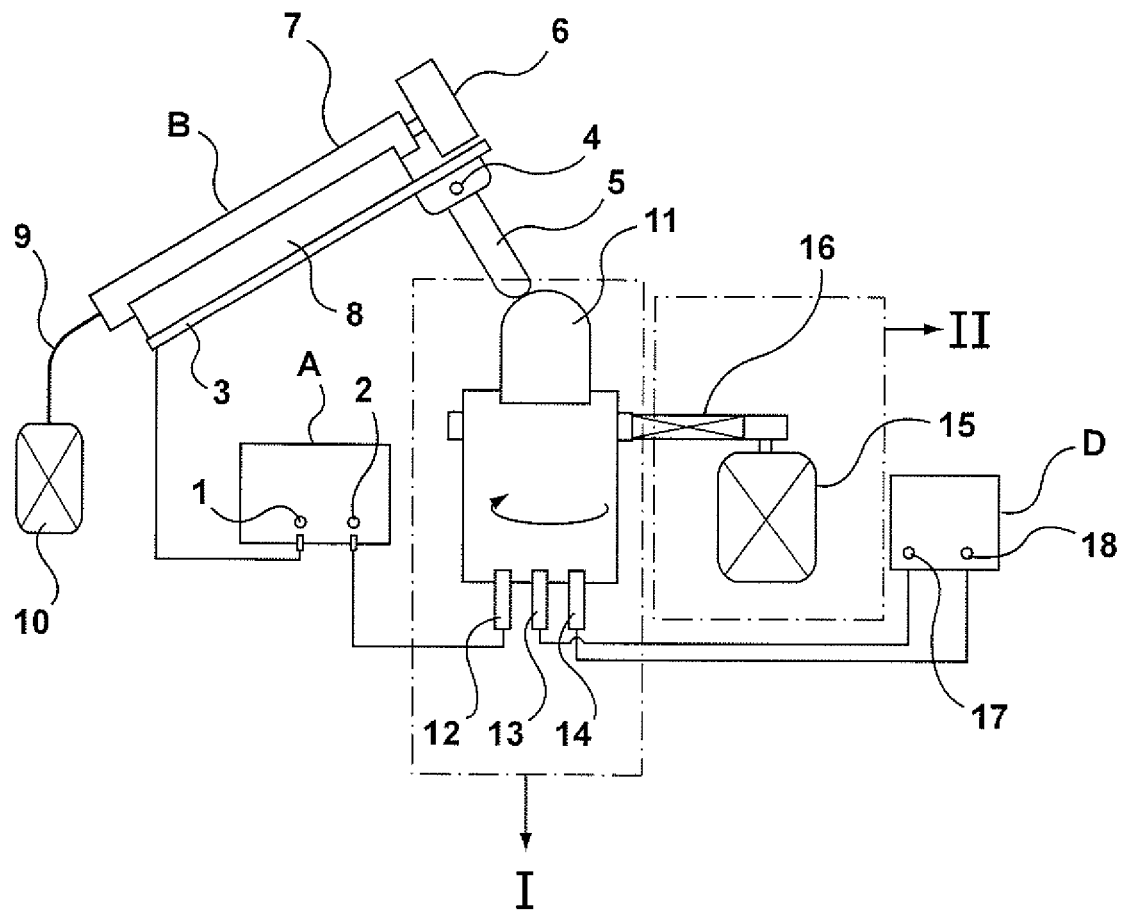
FIG. 1 is a conceptual illustration of an embodiment of apparatus according to an aspect of the invention herein.
Figure 2:
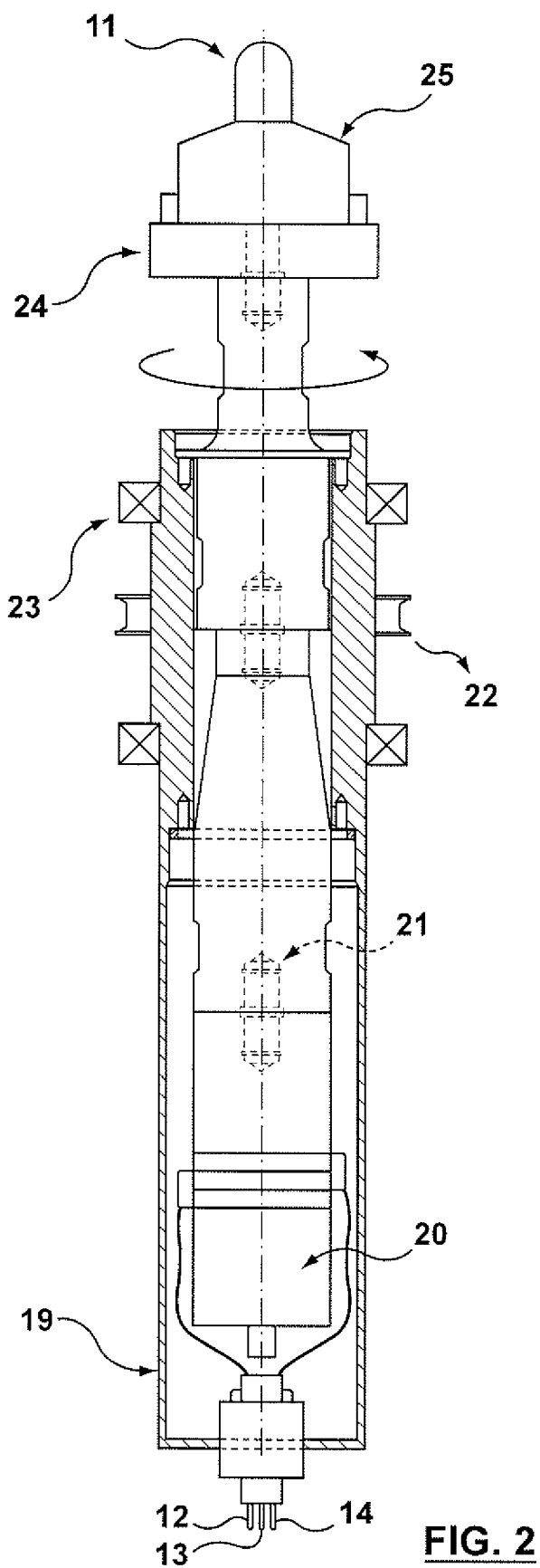
FIG. 2 is the basic illustration of a workbench of the apparatus of FIG. 1.

In the various Figures the annotations identify the following features:
A Electro-spark deposition ESD power source;
B Vibrating ESD coating applicator;
C Integrated transducer assembly I and workbench drive assembly II;
D Ultrasonic Generator;
1 ESD power source positive terminal;
2 ESD power source negative terminal;
3 Resilient conductor spring;
4 Discharge electrode mounting;
5 Discharge electrode;
6 Eccentric wheel;
7 Handle;
8 BAKELITE™ insulator;
9 Flexible shaft;
10 Low power applicator motor;
11 Workpiece;
12 Work bench negative terminal;
13 Integrated transducer negative terminal;
14 Integrated transducer positive terminal;
19 Integrated transducer body;
20 Transducer horn;
21 Ultrasonic transducer;
22 Flat pulley;
23 Ball bearing;
24 Jaw chuck;
25 Drill chuck;
II Drive assembly;
15 Work bench drive motor;
16 V-belt;
17 Ultrasonic power output negative terminal;
18 Ultrasonic power output positive terminal

DETAILED DESCRIPTION

The invention described may tend to provide a rotary electro-spark deposition surface coating process and apparatus, such as may be intended to improve electrode coating quality, tending to aid in increasing electrode life. This invention is particularly suitable to the application of electro-spark deposition coating of resistance spot welding electrodes.

In an embodiment herein, a rotary electro-spark deposition surface coating process includes: mounting a workpiece on to a rotating base or fitting table. The surface of the workpiece is coated using an electro-spark deposition (ESD) process. Ultrasonic vibration is applied to the deposition layer during its crystallization phase. The crystallization phase of the deposition coating is completed while ultrasonic vibration continues to be applied to the workpiece. The process is a rotary electro-spark deposition surface coating process. In this process the workpiece as described may be a resistance spot welding electrode.

In one embodiment, the rotary electro-spark deposition surface coating apparatus may include: a vibrating ESD coating applicator, an electro-spark deposition power source; an integrated transducer assembly; a drive or transmission at, or of a table, or bench or work-station for driving, e.g., rotating, the workpiece relative to the coating applicator; and an ultrasonic vibration generator. The sonic vibration transducer may be mounted to co-operate with the work bench drive. The workpiece is mounted to the integrated transducer and motive drive assembly. In the process, the rotary electro-spark deposition surface coating apparatus may coat or treat workpieces that may be resistance spot welding electrodes.

The rotary electro-spark deposition surface coating apparatus may further include an electro-spark deposition power source A. Power source A may include an ESD power source positive terminal, 1, and an ESD power source negative terminal, 2.

Vibrating applicator B may include a spring conductor 3, a discharge electrode mounting screw 4, a consumable welding rod of coating material, such as may be indicated as a discharge electrode 5, an eccentric wheel 6, a handle, or rod holder, or arm 7, a BAKELITE™ insulator 8, a flexible shaft 9 and a low power applicator motor 10.

In use integrated transducer assembly I may show, or have, the following features, namely a workpiece to be coated 11, work bench or workstation negative terminal 12, an integrated transducer negative terminal 13, an integrated transducer positive terminal 14, an integrated transducer body 19, a transducer horn 20, an ultrasonic transducer 21, a flat pulley 22, a ball bearing 23, a jaw chuck 24 and drill chuck 25.

Workbench drive assembly II may include, or have, a work bench or workstation drive motor 15, and V-belt 16.

Ultrasonic generator D may have or include an ultrasonic power output negative terminal 17, and ultrasonic power output positive terminal 18.

ESD power positive terminal 1 may be connected to a resilient member identified as a conductor spring 3. ESD power negative terminal 2 is connected to workbench negative terminal 12. Discharge electrode 5 is mounted to the spring bar, namely conductor spring 3 by tightening a discharge electrode mounting screw 4. Applicator handle 7 is connected to the low power motor 10 through a connection of, or with, flexible shaft 9. Eccentric wheel 6 is driven in rotation by the driving of the low power motor 10 through the connection of flexible shaft 9 and handle 7 for, or during, the vibrating coating deposition process.

Ultrasonic power output negative terminal 17 is connected to integrated transducer negative terminal 13. Ultrasonic power output positive terminal 18 is connected to integrated transducer negative terminal 14. Integrated ultrasonic transducer assembly I is driven in rotation by drive motor 15 by the use of flat pulley 22 and V-belt 16. Ultrasonic vibration transducer 21 is connected to the integrated transducer negative terminal 13 and integrated transducer positive terminal 14, respectively. Transducer horn 20 and ultrasonic transducer 21 combine to act on the shaft of the rotary work platform. A tool holder, or seat, or mandrel, or center, or jig, in the form of a drill chuck 25, is mounted to the rotary work platform by means of being clamped in the jaws of a rotatable driven chuck 24. Workpiece 11 is mounted to drill chuck 25 during the rotary ultrasonic-assisted ESD process.

The vibrating applicator described above may act as the positive terminal of the ESD process, ft is connected to positive terminal, 1, of the ESD power supply. The discharge electrode 5 (i.e., the welding rod composed of the coating material to be deposited on the workpiece) is mounted to conductor spring 3 by tightening discharge electrode mounting screw 4. Negative terminal 2 of the ESD power source, or power supply, A, is connected the negative terminal 12 of the work bench or work station. Vibrating ESD deposition is carried out during simultaneous operation of the low power motor 10, flexible shaft 9, handle 7 and eccentric wheel 6.

The ultrasonic generator output positive terminal 18, and ultrasonic output negative terminal 17 are connected to the respective positive and negative terminals 14 and 13 of the work bench respectively.

Transducer horn 20 is connected to the ultrasonic transducer 21 by a shaft. Transducer horn 20 then drives the jaw chuck 24 and the tool holder, namely drill chuck 25 of the work bench rotation through the couplings of the rotating shaft. The ultrasonic transducer is contained inside a transducer casing or housing. The transducer casing is built of insulating materials. Jaw chuck 24 is mounted to the driven output rotating shaft using a dedicated screw. Drill chuck 25 is then mounted to, or connected to, jaw chuck 24. The workpiece, in this embodiment resistance spot welding electrode 11, which is secured to or in drill chuck 25, is driven in rotation and the coating material is applied according to the ultrasonic assisted electro-spark deposition process. The rotating shaft drive driven by motor 15 and the vibrating drive provided by ultrasonic transducer 21 are thus, combined in an integrated unit.

This description describes, inter alia, an apparatus such as may be used to apply ESD coatings to work piece surfaces to modify the properties of those surfaces. The work piece may be moving, e.g., rotating during the process. That apparatus may be used according to an ESD coating application procedure that may include the steps of:

1. Choosing a type of discharge electrode prepared with the proper composition of materials for the desired ESD coating to be applied; and mounting the discharge electrode to the vibrating applicator. A resistance spot welding electrode may be selected as the workpiece in this application example.
2. Turning on power to the apparatus, including power to the electro-spark deposition power source, power to the ultrasonic generator, power to the workbench motor drive and to the vibrating applicator. The process may include adjusting the associated operational parameters including the vibrating applicator frequency, motor drive speed and ultrasonic generator power. In the ultrasonic assisted electro-spark deposition process, contact between the discharge electrode and the workpiece should be made lightly, with a component of relative horizontal (e.g., tangential) modulation movement to cause a layer of coating to be deposited on the workpiece surface. The time duration of the process may depend on the thickness to be deposited and the type of coating material. The basic principle is that the coating be applied made evenly on the surface of the workpiece, and should cover the surface completely. No base metal of the workpiece contact surface should be left open or uncovered. Also, the time duration of the electro-spark deposition process should not be too long, to avoid softening and annealing of the copper alloy material of the workpiece.
3. Turning off the power to the workbench when the electro-spark deposition process is completed; and removing the coated electrode (workpiece) from the fixture assembly. This coating process may then be repeated with another uncoated workpiece, as may be.
4. Turning off power to all other devices if there is another coating process to implement.

The apparatus shown and described herein concerns use of ultrasonic-assisted ESD coating technology. It differs from traditional vibrating ESD coating processes. Comparison may be made with patent CN102019531A:

1. In the apparatus and method described herein, ultrasonic vibration is applied to the workpiece being coated in the electro-spark deposition process. Grain crystallization of the coating material takes place under the application of ultrasonic vibration. By contrast, patent CN102019531A specifies the application of ultrasonic vibration to the discharge electrode. The surface coating on the workpiece produced directly under the application of ultrasonic vibration is different from the ones produced by using the other approach. Having direct ultrasonic vibration applied to the workpiece is thought to be a new, useful, and unobvious feature of the apparatus and method shown and described herein. Having ultrasonic vibration applied to the workpiece during the grain crystallization of the coating material in the electro-spark deposition process is also understood to be a new, useful, and unobvious feature shown and described herein. These features are thought to tend to improve grain refinement of the coating material and adhesion between the coating and the metal matrix of the base substrate.
2. In the apparatus shown and described herein, ultrasonic vibration is applied to the workpiece being coated in the ESD process. Ultrasonic vibration in this case may improve or reduce the influence of the heat-affected zone (HAZ). Meanwhile the application of ultrasonic vibration to the discharge electrode as claimed in CN 10201931A appears to have no influence on the HAZ between the ESD layer and the substrate metal matrix.

The apparatus and method described herein may have relative simplicity of operation, may be relatively low in cost, may have high applicability, and may emit relatively little noise.

In the embodiment or application example described herein, the ultrasonic power may be 70 W, ultrasonic frequency may be 50 kHz, the rotational speed of the workbench may be 700 rpm, the material of the discharge electrode may be TiC, the electro-spark deposition voltage may be 7V, and deposition time duration may be 2 minutes.

For comparison, samples were produced with the same parameters except that one set was treated with the application of ultrasonic vibration as described herein, while the other sample was treated without ultrasonic vibration. From this comparison test, it was found that the electro-spark deposition coating applied under ultrasonic vibration exhibited improvements over the ones in which the coating was applied without ultrasonic vibration: Higher coating hardness; reduction in coating defects; and better adhesion of the coating to the metal matrix substrate. Performing welding life tests, the working life of TiC electro-spark deposition coated under ultrasonic vibration welding electrodes was found to be 800 welds while the ones coated without ultrasonic vibration was 500 welds.

Figure 3:
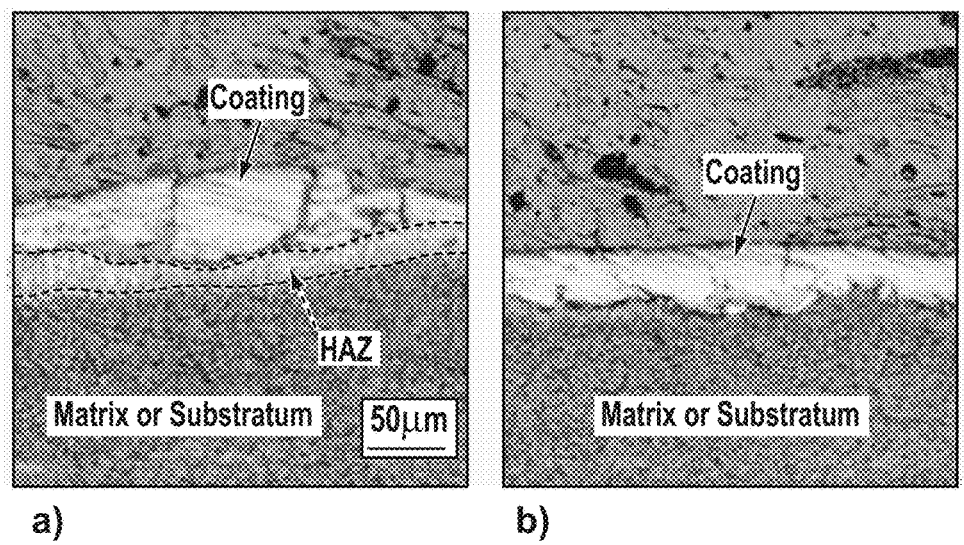
FIG. 3 shows a metallurgical comparison chart of coatings of different technology:
 a) coating without ultrasonic-assisted, b) with ultrasonic-assisted.

FIG. 3 illustrates the microstructure of the coatings produced under the two different conditions. FIG. 3b shows that coating defects are reduced when the coating is deposited at the same time as ultrasonic vibration is applied to the workpiece. The size of the HAZ zone and its grain size is significantly less than that of the sample coated without the application of ultrasonic vibration as shown in FIG. 3a.

Figure 4:
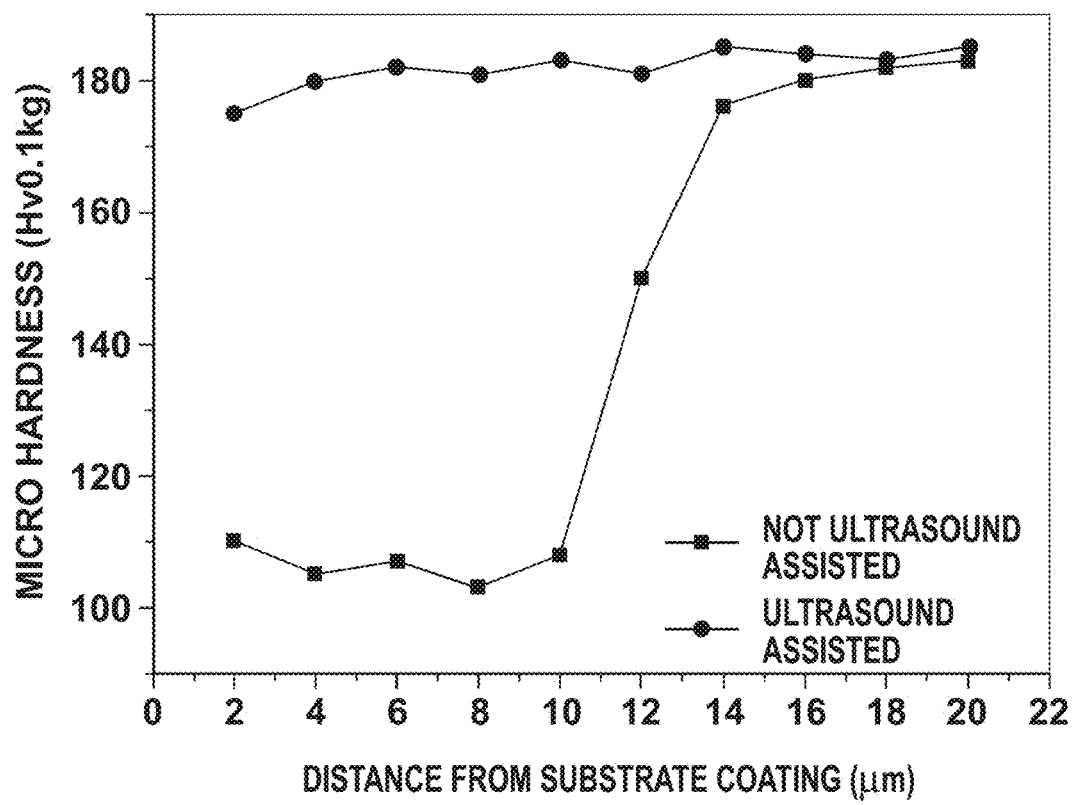
FIG. 4 is the micro-hardness comparison of different coating technology.

FIG. 4 charts micro-hardness of coating layers applied with and without ultrasonic vibration. It is observed that the micro-hardness of the coating applied with the use of ultrasonic vibration (small round dot line) is very even across, such that a HAZ region transition is not obvious. Meanwhile it is noted that there is a section of the micro-hardness line of the coating applied without the use of ultrasonic vibration (small square dot line) has a significant drop in hardness indicating the existence of the HAZ. It can be concluded that grain growth in the HAZ at the coating is significantly affected by the application of ultrasonic vibration. The dendrites which exist in the HAZ area are reduced, or broken off, when the coating is produced with the application of ultrasonic vibration on the workpiece. This may tend to avoid the formation of large grains and thus a significant HAZ.

Figure 5:
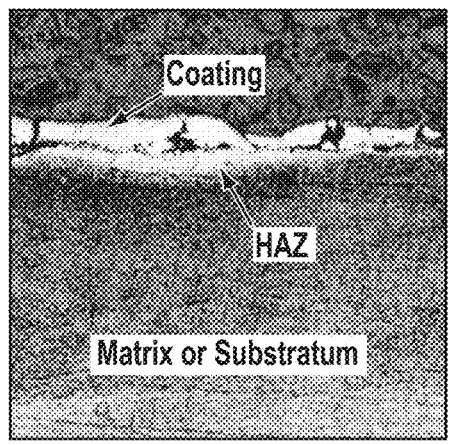
FIG. 5 is a metallurgical chart of a coating under patent CN 102019531A.

FIG. 5 shows the microstructure of the coating applied according to Patent CN 102019531 A, in which ultrasonic vibration is applied to the discharge electrode. In this case, ultrasonic power is 70 W, ultrasonic frequency is 50 kHz, rotational speed of the work station is 700 rpm, the material of the discharge electrode is TiC, the electro-spark deposition voltage is 7V, deposition time is 2 minutes. By comparing FIGS. 5 and 3a, the coating defects and the grain sizes of the HAZ when coating with ultrasonic vibration applied to the discharge electrode appears to yield no significant difference from the coating deposited without application of ultrasonic vibration. A welding electrode life test was performed. It found that the welding life of the electrode coated with the application of ultrasonic vibration to the discharge electrode to be 500 welds. This is the same as the working life of the welding electrode coated without ultrasonic vibration.

With the ultrasonic-assisted electro-spark deposition technology, this apparatus and method described herein may yield improved grain refinement of the coatings, and may tend to avoid or reduce the occurrence of a HAZ that might cause increased service problems. The apparatus and method may tend effectively to overcome, or ameliorate, the defects and difficult problems of coatings produced using conventional electro-spark deposition technology. In addition, the cost of the apparatus may be modest, and the apparatus may be relatively simple to operate. The apparatus and method described herein may have a wide spectrum of application. Other than the resistance welding electrodes, the apparatus and method may be applied to the ESD coating of other workpieces, such as rotating workpieces.

As many variations and modifications are possible, the application of this invention covers is intended not only to encompass the above mentioned example, but also to encompass such other concepts or alternations falling within the principles, aspects, and features of the invention shown and described herein.

We claim:

1. An electro-spark deposition apparatus for coating an electrically conductive workpiece, said electro-spark deposition apparatus comprising:
    an ultrasonic transducer assembly; a workbench drive assembly; an ultrasonic generator; a spark power supply; and a coating applicator;
    said ultrasonic transducer assembly including an ultrasonic transducer body, an ultrasonic transducer mounted within said ultrasonic transducer body; and a first chuck to which the workpiece is mounted in use;
    said workbench drive assembly and said ultrasonic transducer assembly being mounted together, via a transmission mechanism coupling the workbench drive assembly and the ultrasonic transducer body, and being separate from the coating applicator;
    said ultrasonic generator being electrically connected to said ultrasonic transducer assembly;
    said coating applicator has a first discharge electrode mounting in which to place a discharge electrode;
    said spark power supply has a first terminal connected to said coating applicator and a second terminal connected to said ultrasonic transducer assembly; and
    said coating applicator is movable relative to said ultrasonic transducer assembly and said workbench drive assembly to apply an electro-spark discharge coating to the workpiece, whereby the ultrasonic transducer is configured to vibrate the workpiece even after the coating applicator is no longer in contact with the workpiece.

2. The electro-spark deposition apparatus of claim 1 wherein:
    said workbench drive assembly is a rotary drive;
    said coating applicator includes said discharge electrode mounting and a vibrator;
    said first terminal is an electric spark positive terminal, and said second terminal is an electric spark negative terminal;
    said vibrator includes a vibrating plate, said discharge electrode mounting, an eccentric wheel, a handle, an insulator, a flexible shaft, and a power motor;
    said ultrasonic transducer assembly includes a table negative terminal, an ultrasonic transducer input negative terminal, an ultrasonic transducer input positive terminal, said transducer body, a transducer horn, said ultrasonic transducer, a pulley, a bearing, a jaw chuck, and said first chuck, said first chuck being a drill chuck;
    said rotary drive of said workbench drive assembly includes a table drive motor, and said transmission mechanism, said transmission mechanism being a transmission belt;
    said ultrasonic generator has an ultrasonic output negative terminal, and an ultrasonic output positive terminal;
    said electric spark positive terminal and said vibrating plate are connected;
    said electric spark negative terminal and said table negative terminal are connected,
    said discharge electrode is connected through said first discharge electrode mounting and through said vibrating plate;
    said flexible shaft and said power motor are connected to rotate the eccentric wheel to cause vibration during welding;
    said ultrasonic generator output negative terminal and said ultrasonic transducer input negative terminal of said ultrasonic transducer assembly are connected;

said ultrasonic generator output positive terminal and said ultrasonic transducer input positive terminal of said ultrasonic transducer assembly are connected;

said table drive motor drives a rotating platform of said ultrasonic transducer assembly through said pulley and said transmission belt;

said ultrasonic transducer, said input negative terminal, and said input positive terminal of the ultrasonic transducer assembly are connected;

said ultrasonic transducer horn and said ultrasonic transducer are connected; and a rotating shaft of said rotating platform, said drill chuck and said jaw chuck are mounted to said rotating platform; and, in use, the workpiece to be coated is held in said drill chuck during ultrasonic electro-spark deposition.

3. The electro-spark deposition apparatus according to claim 2, wherein the work piece is a spot-welding electrode.

4. A process of electro-spark deposition on a rotating body using the electric spark deposition modifying apparatus according to claim 2, wherein the work piece is placed on said rotating platform, the surface of the workpiece is melted using electro-spark deposition, ultrasonic vibration is applied while coating of the workpiece during crystallization, and the coating and the crystallization are completed during the ultrasonic vibration.

5. The process of electro-spark deposition according to claim 4, wherein the workpiece is a spot-welding electrode.

6. The electro-spark deposition apparatus of claim 1 wherein said ultrasonic transducer operates during at least one of:

(a) the electro-spark deposition of the coating; and
(b) crystallization of the electro spark deposition coating.

7. The electro-spark deposition apparatus of claim 1 wherein said ultrasonic transducer operates during crystallization of the electro spark deposition coating.

8. The electro-spark deposition apparatus of claim 1 wherein said coating applicator includes a vibrator.

9. The electro-spark deposition apparatus of claim 8 wherein said vibrator of said coating applicator includes a spring.

10. The electro-spark deposition apparatus of claim 1 wherein said ultrasonic transducer operates during crystallization of the electro spark deposition coating; said coating applicator includes a vibrator; and said vibrator includes a spring.

11. The electro-spark deposition apparatus of claim 2 wherein said ultrasonic transducer operates during at least one of (a) the electro-spark deposition of the coating; and
(b) crystallization of the coating.

12. The apparatus of claim 2 wherein said ultrasonic transducer operates during crystallization of the coating.

13. The electro-spark deposition apparatus of claim 2 wherein said vibrating plate of said coating applicator is a spring.

14. The electro-spark deposition apparatus of claim 2 wherein said ultrasonic transducer operates during crystallization of the electro spark deposition coating; said coating applicator includes said vibrating plate; and said vibrating plate of said coating applicator is a spring.

* * * * *